July 25, 1939. E. L. WETZIG 2,167,133
FRUIT PICKER
Filed Nov. 3, 1937
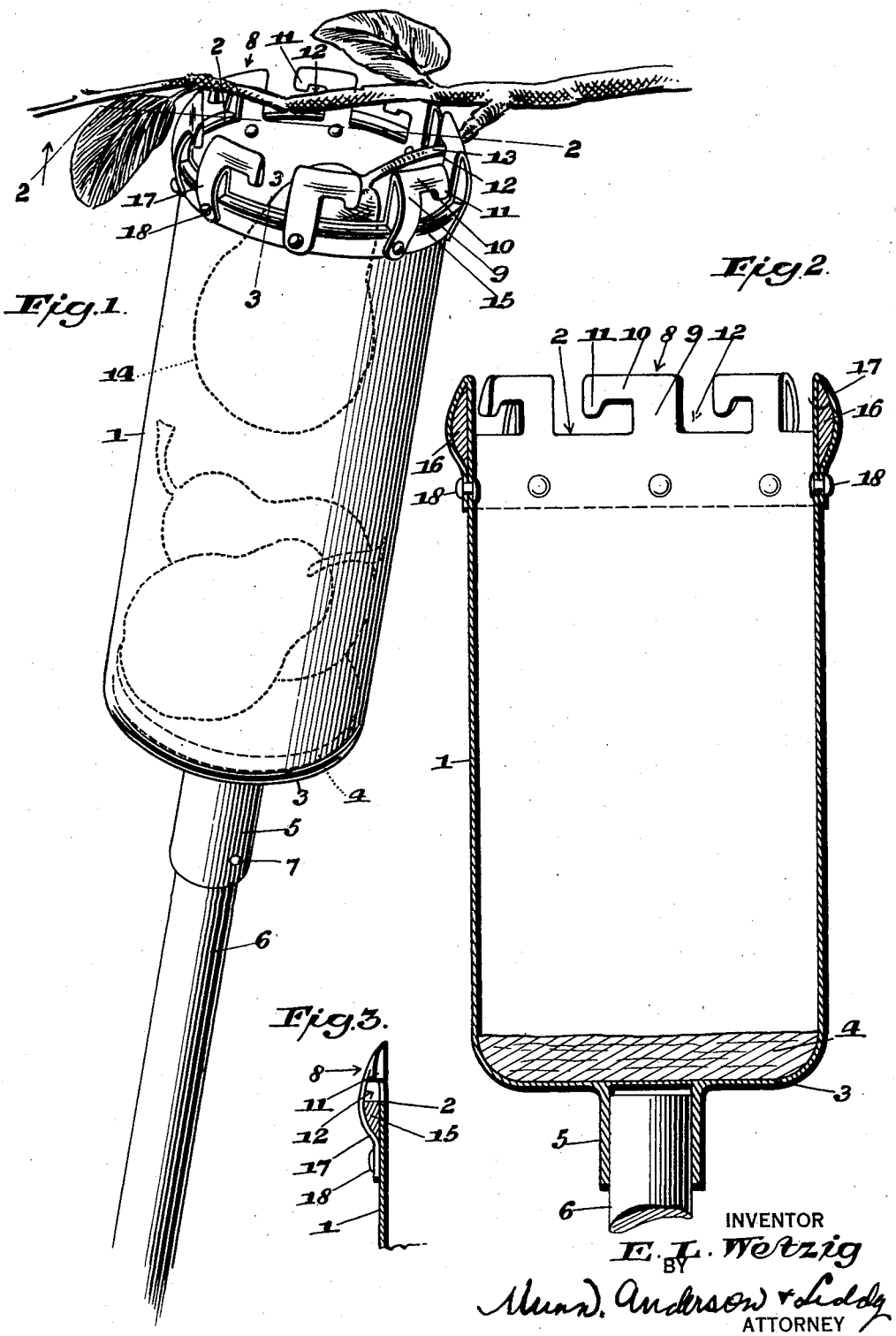
INVENTOR
E. L. Wetzig
BY
Munn, Anderson + Liddy
ATTORNEY Patented July 25, 1939

2,167,133

UNITED STATES PATENT OFFICE 2,167,133

FRUIT PICKER

Ernest L. Wetzig, Clint, Tex.

Application November 3, 1937, Serial No. 172,606

3 Claims. (Cl. 56—339)

This invention relates to improvements in fruit picking devices. While the instant device is particularly intended for use in picking pears, yet it is not confined to that use and it will appear obvious that other stemmed fruit can be picked therewith to equally good advantage.

One of the difficulties encountered in picking pears, using this solely for an illustration, is the loss which is occasioned by knocking off small and partially ripe fruit, while singling out the larger sizes. This loss is virtually impossible to prevent because picking is almost universally done by an operator upon a ladder against the tree, and it is the vibration and shaking of the tree and its branches that causes the fruit to fall, in many instances those specimens which should remain for growing.

The instant invention does not replace the ladder, but it has been found to be so advantageous in its use that most of the losses mentioned before can be avoided. In some instances the ladder can be dispensed with, for instance when making the handle long enough to enable the operator to reach up between the branches, even the highest ones, to get at the fruit. With this premise in mind the objects of the invention are as follows:

First, to provide a fruit picker of the utmost simplicity, not having any moving parts, and being so constructed as to enable the operator to pick fruit of desirable sizes from other and closely hanging smaller fruit, without so much likelihood of knocking the latter off of the branch.

Second, to provide a fruit picker of such a shape that it is easily withdrawn through the tree branches without shaking off the fruit.

Third, to provide a fruit picker which essentially comprises a cup with a serrated edge that is used to sever the stems of successive fruit from their branches, to drop into the cup until it is filled.

Other objects and advantages will appear in the following specification, reference being had to the accompanying drawing, in which:

Figure 1 is a perspective view of the improved fruit picker, illustrating the manner of its use.

Figure 2 is a central vertical section thereof taken on the line 2—2 of Fig. 1.

Figure 3 is a detail cross section taken on the line 3—3 of Fig. 1.

In carrying out the invention provision is made of a receptacle 1. This comprises an elongated cup, which obviously is open at its rim 2 and has a closed bottom 3. The latter is padded at 4 on the inside so as to lessen the bruising of the fruit as it falls. A desirable substance from which to make the padding is felt, but there are other materials from which the padding can be made.

A ferrule 5 centered on the bottom 3 provides the receptacle for a handle 6. This handle may be pinned in place at 7 so as to prevent the accidental loosening and falling off of the receptacle, especially when filled with fruit. The rim 2 is serrated at 8, the particular type of serrations herein disclosed comprising projections 9 and the lateral extensions 10 thereof which end in short lugs 11 which give the serrations the general appearance of hooks. These hooks are necessarily spaced at 12 so as to allow the stem 13 of the fruit to be caught as the receptacle is emplaced upon the fruit in the approximate position illustrated in Fig. 1. The hooks are not sharpened anywhere. To the contrary they are smoothed off at all places so as to avoid any possibility of scratching the fruit. Further protection for the latter is afforded by reinforcing the rim 2 with a covering 15 of some firm yet soft material. This material also takes the general shape of the serrations or hooks 8 inasmuch as portions of it are carried up in the projections 9 as at 16 (Fig. 2).

The projections 9 are situated in the plane of the wall of the cup. According to the present showing the outer metallic web 17 (Fig. 1) of each hook is bent down and carried below the rim 2 where a rivet 18 is driven through and headed to secure the reinforcement 15 and to make a generally solid assemblage.

In its operation the fruit picker is emplaced over the fruit 14, and is then given a short upward push or turning motion, the stem 13 being in one of the hook spaces 12, will be disconnected from the adjacent tree branch. This disconnection does not comprise an actual cut, as would be made by a sharpened instrument. It is simply the suddenness of the up-thrust or partial turn that breaks the stem loose. Successive fruit is dropped into the picker receptacle and the operation is repeated until the receptacle is filled. Thereupon the fruit is rolled out into a bucket, basket or the like.

One of the advantages of the picker is that the operator is enabled to single out the largest pears or the like, and remove them without knocking off so many smaller and undeveloped pears. Again, when the main picking is over it is much easier to go back over the same territory and remove such pears which were left to grow. The fruit picker also lends itself to the individual use of customers who are permitted to enter the orchards and pick pears of their own selection, the use of the instant picker avoiding the necessity of furnishing ladders from which the customers might fall.

I claim:

1. A fruit picker comprising a receptacle, a series of hooks around the rim of the receptacle, each hook including a projection and an outer web, a reinforcing covering on the outside of said rim including portions carried up between each projection and web, and means fastening the individual webs and the covering to the rim.

2. A fruit picker comprising a receptacle, a series of hooks around the rim and upstanding therefrom, each hook including a projection from the rim and being bent upon itself to provide an outer web, a reinforcing covering of soft material on the outside of and flush with the rim, including portions between each projection and web acting as a filler to make the webs bulge, and means fastening the individual webs and the covering to the rim.

3. A fruit picker comprising a receptacle, a series of hooks around the rim of the receptacle, said hooks being hollow, and a filler in the hooks making the outer walls of the hooks bulge beyond the outer surface of the receptacle.

ERNEST L. WETZIG.